United States Patent [19]
Klein

[11] Patent Number: 5,748,957
[45] Date of Patent: May 5, 1998

[54] COMPUTER SYSTEM USAGE DETERMINATION BASED ON HARD DISK DRIVE ACTIVITY

[76] Inventor: Dean A. Klein, 36400 Golfview Ridge, Lake City, Minn. 55041

[21] Appl. No.: 602,337

[22] Filed: Feb. 16, 1996

Related U.S. Application Data

[60] Provisional application No. 60/000,549 Jun. 27, 1995.
[51] Int. Cl.⁶ .................................................. G06F 9/06
[52] U.S. Cl. .................................. 395/652; 395/186
[58] Field of Search ............................ 395/186, 651, 395/652, 653, 712

[56] References Cited

U.S. PATENT DOCUMENTS

| | | | |
|---|---|---|---|
| 5,063,496 | 11/1991 | Dayan et al. | 395/186 |
| 5,361,359 | 11/1994 | Tajalli et al. | 395/186 |
| 5,432,939 | 7/1995 | Blackledge, Jr. et al. | 395/186 |
| 5,557,742 | 9/1996 | Smaha et al. | 395/186 |
| 5,586,301 | 12/1996 | Fisherman et al. | 395/186 |

*Primary Examiner*—Kevin A. Kriess
*Attorney, Agent, or Firm*—Arnold, White & Durkee

[57] ABSTRACT

A method of determining a pattern of usage of a computer system. The method may be performed by a computer (1) having a bootable writable storage medium and (2) executing a usage-monitor program stored in the boot-up portion of the storage medium. The method may include signaling the presence of the usage-monitor program and overwriting the usage-monitor program with another computer program or a standard boot-sector. Alternatively, the method may be performed by a computer hard disk drive having (1) a writable storage medium, (2) firmware, and (3) executing a usage-monitor program stored in the firmware. This method may include writing information representative of at least one command sent to the computer hard disk drive on the storage medium.

22 Claims, 6 Drawing Sheets

Cylinder Information:

COMPUTER SYSTEM USAGE DETERMINATION BASED ON HARD DISK DRIVE ACTIVITY

This application claims priority from Provisional Application Serial Number 60/000,549, filed Jun. 27, 1995.

1. BACKGROUND OF THE INVENTION

It is often desirable to determine the pattern of usage of a computer system. For example, it may be desirable to determine whether a computer system has been used at all. If a computer system purchaser returns the system to the manufacturer for some reason, the manufacturer may be unable to resell it as a new system.

An IBM compatible personal computer system using the MS-DOS or PC-DOS operating system is used here as an illustrative example (the invention, however, is applicable to other operating systems, e.g., the well-known UNIX operating system). As is well-known to those of ordinary skill, such computers cannot perform many useful tasks unless they are running an operating system, i.e., the software that allows the computer to use other software. However, before such a computer can run the operating system, it must load the operating system from a storage device such as computer disk or flash memory to main memory.

When such a computer is turned on, a basic input/output system (BIOS) boot program, commonly stored in a read-only memory (ROM), attempts to locate a "bootable" computer disk. (The term "boot" is industry shorthand for the process by which a computer starts itself up by "pulling itself up by its bootstraps" as discussed in more detail below.) If such a disk is found, the BIOS boot program loads into memory the information found in the boot sector of the disk and branches to a start-up program routine, referred to as a loader program, found in a specific place within that boot-sector information. The loader program checks whether certain "system files" are present on the disk.

If these system files are present, then they are loaded into main memory (if not, then the loader program issues an error message). The data contained in these system files enables the computer to load additional operating-system files from the disk drive. After the computer loads these files, the computer is able to run application programs and perform many useful tasks.

Most BIOS boot programs boot from floppy disks and hard disks; some BIOS boot programs may also boot from flash memory as well. While flash memory is not configured in sectors and cylinders, it does contain a boot-up portion which is similar in function to a disk's boot-sector.

2. SUMMARY OF THE INVENTION

The method relates to a method of determining a pattern of usage of a computer system. The method may be performed by a computer (1) having a bootable writable storage medium and (2) executing a usage-monitor program stored in the boot-sector of the storage medium. The method may include signaling the presence of the usage-monitor program and overwriting the usage-monitor program with another computer program or a standard boot-sector.

Alternatively, the method may be performed by a computer hard disk drive having (1) a writable storage medium, (2) firmware, and (3) executing a usage-monitor program stored in the firmware. This method may include writing information representative of at least one command sent to the computer hard disk drive on the storage medium.

3. BRIEF DESCRIPTION OF THE DRAWINGS

4. DESCRIPTION OF ILLUSTRATIVE EMBODIMENTS

It is unlikely that a computer is typically used without performing hard disk drive activities. For example, a computer typically accesses the hard disk drive when booting. Thus, hard disk drive usage is an indicator that can be used to determine whether a computer has been used. The hard disk drive, a storage medium, can be used to store hard disk drive usage information.

One illustrative embodiment of the invention takes the form of a method for determining a pattern of usage of a computer system. In the interest of clarity, not all features of an actual implementation are described in this specification. It will of course be appreciated that in the development of any such actual implementation (as in any computer-system development project), numerous engineering and programming decisions must be made to achieve the developers' specific goals and subgoals such as compliance with system- and business-related constraints, which will vary from one implementation to another. Moreover, attention will necessarily be paid to proper programming practices for the environment in question. It will be appreciated that such a development effort might be complex and time-consuming, but would nevertheless be a routine undertaking of system development for those of ordinary skill having the benefit of this disclosure.

4.1 First Illustrative Method

Figure 1:
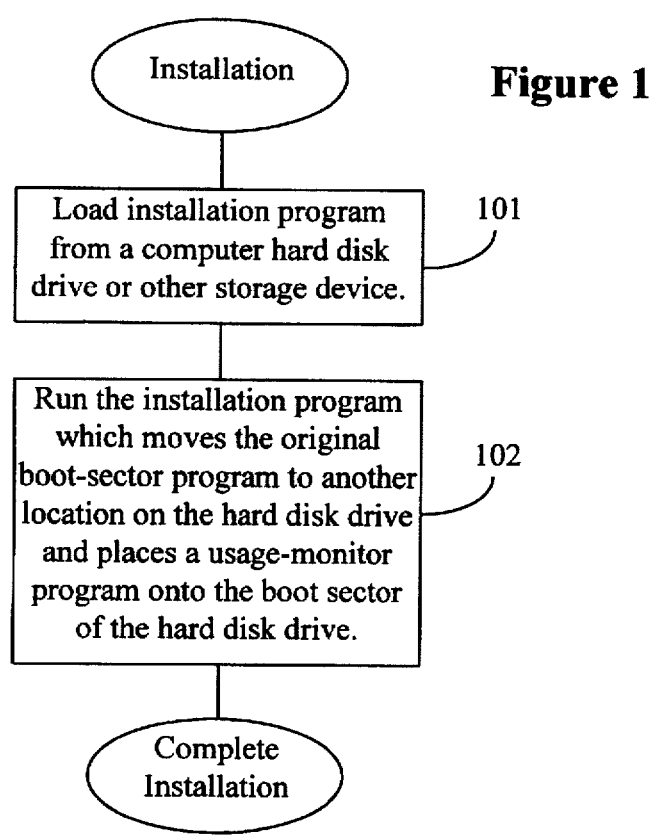
FIG. 1 is a flow diagram of one illustrative embodiment of the installation procedure for the invention.

Referring to FIG. 1, in the most simple form, an installation program may be run from a hard disk, floppy disk, a CD, or any other storage medium. When run, this installation program moves the original boot-sector program such as DOS or WINDOWS 95 from the boot-sector to a different location on the hard disk drive. See block 101. Next, the installation program places a usage-monitor program onto the boot-sector of the hard disk drive. See block 102. The usage-monitor program does not require any modifications to the hard disk drive's firmware. At this point, the installation of the usage-monitor program is complete.

Figure 2:
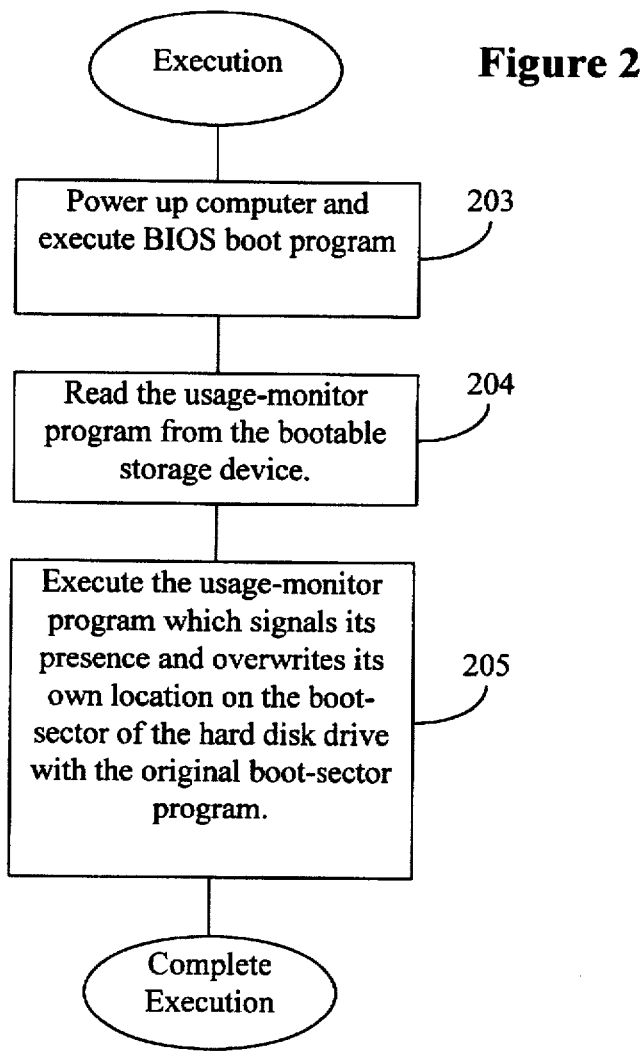
FIG. 2 is a flow diagram of a first illustrative embodiment of the invention.

Referring to blocks 203 and 204 of FIG. 2, during the first boot process after installation of the usage-monitor program, the computer reads and executes the usage-monitor program which is located on the boot-sector of the hard disk drive. The usage-monitor program may signal its presence in any of several ways as described below. Next, the usage-monitor program may overwrite its own location on the boot-sector of the hard disk drive with the original boot-sector program. Finally, the usage-monitor program may optionally instruct the computer to re-boot, thereby running the original boot-sector program. Thus, the usage-monitor program is read and executed only once, when the computer is first booted. This once-only usage detection is useful in itself.

The signal that may be provided by the usage-monitor program may be one of several types. For comparatively low intrusiveness, the signal could take the form of merely presenting a data pattern on the data bits of the parallel port. This could be detected at the factory by attaching a device to the parallel port prior to booting. A more intrusive form might be a signal in the form of one or more audible tones on a computer speaker, a message on the CRT, or flashing the LEDs on the keyboard.

If desired, the usage-monitor program could be designed to test for the presence of a manufacturer's configuration circuit, e.g., attached to the parallel port, and not to overwrite itself if such a circuit is present. That would permit a factory technician to test whether the system has been used without destroying the usage-monitor program if it turns out that the system in fact has not been used. However, the existence of such a capability would probably become known, so that an unscrupulous but technically sophisticated computer user might be able to bypass the usage-monitor program. Such a user might be able to use a computer, then return it to the factory under a money-back program as though the computer had never been used. (In addition, such a user might be able to plant a virus on the disk while making it appear that the disk had never been used.) This problem could be addressed by using a suitable security system for the configuration circuit, e.g., as used in "dongle" security devices of the type well known in the art.

An unscrupulous computer user might also try to defeat the usage-monitor program by booting the computer from a floppy-disk drive or from a network. This type of bypass effort could be addressed by designing the computer's BIOS so that booting of a new, unused system can take place only from the hard-disk drive.

4.2 Second Illustrative Method

Figure 3:
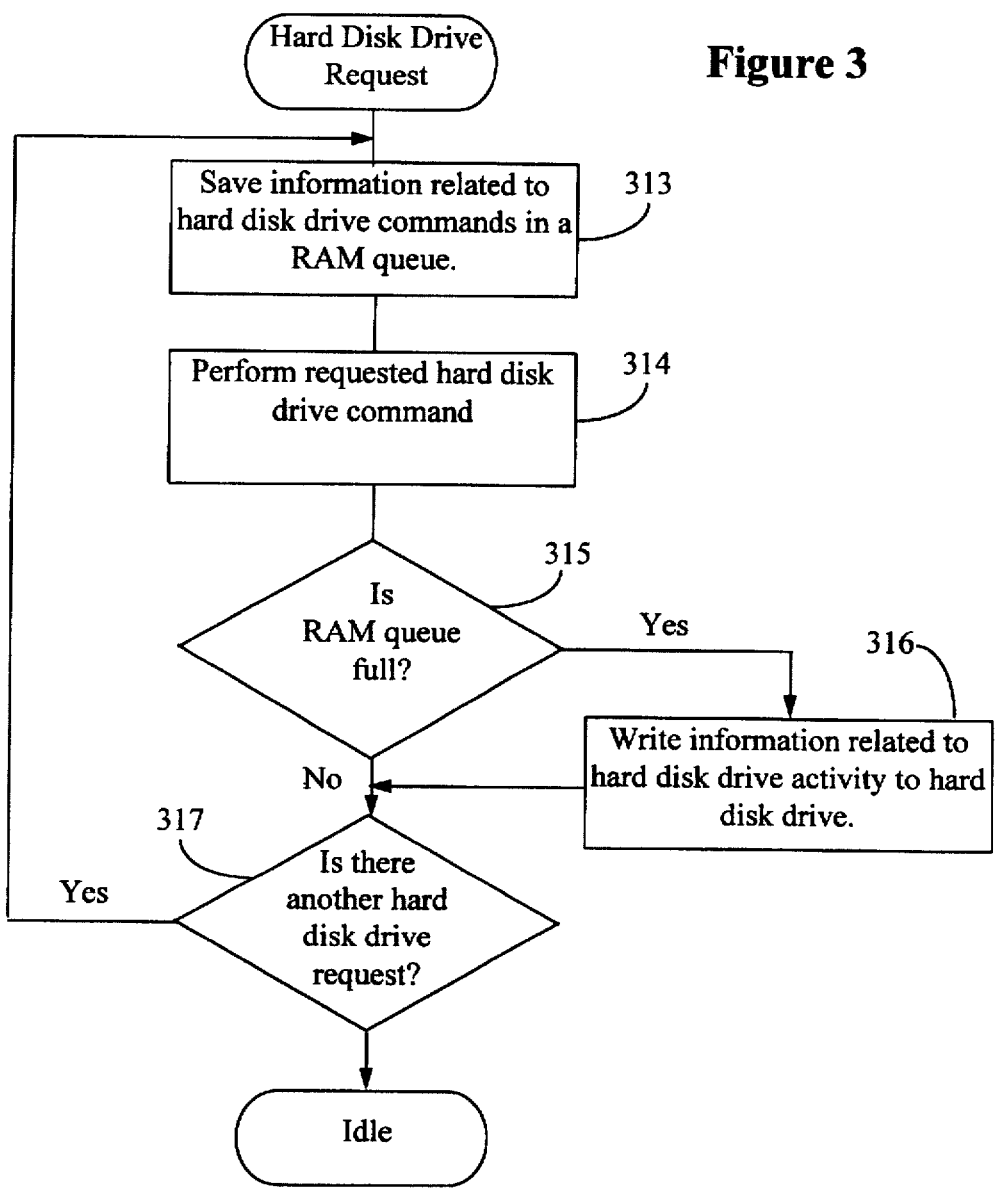
FIG. 3 is a flow diagram of a second illustrative embodiment of the invention.
Figure 4:
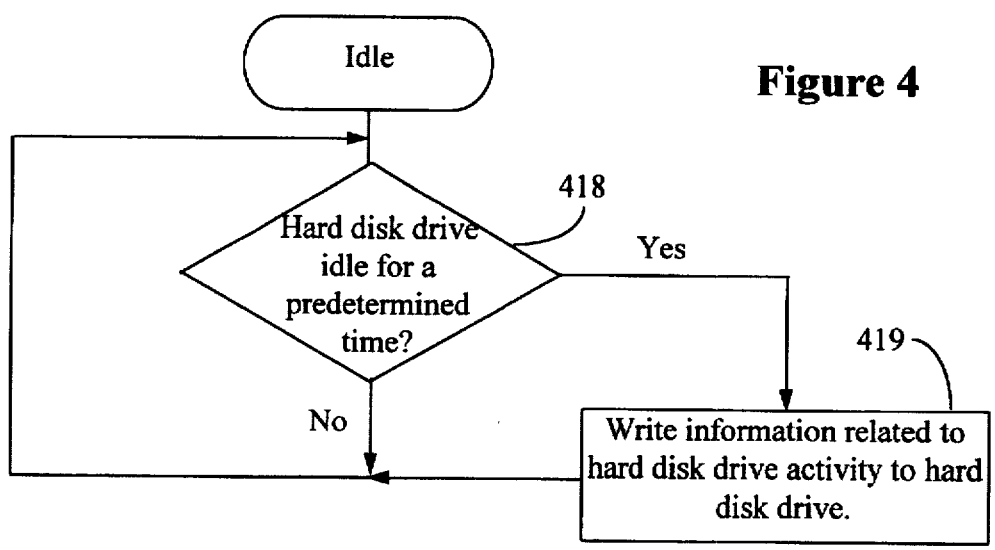
FIG. 4 is a flow diagram of a third illustrative embodiment of the invention.

A more complicated approach provides more usage information. In this approach, a usage monitor program is included in the hard disk drive firmware. Flowcharts for this firmware are shown in FIGS. 3 and 4. The microcontroller on the hard disk drive records information related to the commands sent to the hard disk drive in a designated area of the hard disk drive. See blocks 316 and 317.

One such implementation places the designated area on an unused cylinder or reserved cylinder on the hard disk drive and optionally marks that area as "unusable" for normal storage. Referring to FIG. 3, block 313, when a hard disk drive command is received, then the information related to it is stored in a memory queue such as a RAM queue. Because storing information in memory is significantly faster than storing information on the hard disk drive, this embodiment is more efficient. After the information related to the hard disk drive command is stored, then the command is performed. See block 314. As is shown in blocks 315, 316, and 317, the information is written to the hard disk drive when the memory queue is full. Referring to blocks 418 and 419 of FIG. 4, the memory queue may also be written to the hard disk drive when the hard disk drive has been idle for a predetermined time such as one minute.

Such an implementation has the drawback of requiring the hard disk drive heads to physically move to the unused cylinder or reserved cylinder to record the usage information. As this might degrade the performance of the drive, these updates might be queued up and written on a periodic basis. One drawback of this embodiment is that some usage data may be lost if the power is removed while the usage data is still in the queue to be written to the designated area.

4.3 Third Illustrative Method

Figure 5:
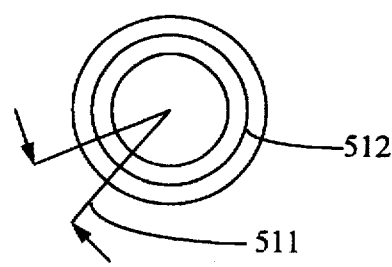
FIG. 5 is a diagram of a disk on a hard disk drive.
Figure 6:
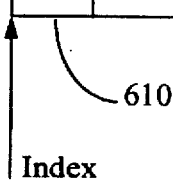
FIG. 6 is a diagram of the cylinder information stored on a computer hard disk drive.

Referring now to FIGS. 5 and 6, another implementation would be to record usage information on each cylinder of the hard disk drive. As such usage information is likely to be relatively small in comparison to the data on each cylinder, the storage impact is negligible. The performance impact is also negligible as the rotational rate and bit densities of the drives remain the same. The data formatter logic on the drive may be enhanced to retrieve and update the usage bits. Each cylinder 512 on the hard disk drive has a cylinder number field 610. This cylinder number field 610 is retrieved by the data formatter following each seek of the heads. In one embodiment of this invention, the usage information may be added to the cylinder number field 610. The usage information may be related to the number of cylinder accesses, i.e., cylinder reads, cylinder writes, or even cylinder seeks. The addition of information to the cylinder 512 results in the reduction of the size of the gap 511, which is the area of the cylinder 512 that is not used for the storage of information.

4.5 Program Storage Device

As noted above, any of the foregoing variations may be implemented by programming a suitable general-purpose computer or general purpose computer hard disk drive having appropriate hardware. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here except as may be noted otherwise above.

4.6 Remarks

Those of ordinary skill having the benefit of this disclosure will appreciate that the invention provides a number of advantages. For example, the invention allows one to determine whether a computer system has been used. This determination is important because if a computer system purchaser returns a system to the manufacturer for some reason, the manufacturer may be unable to resell it as a new system. However, if the manufacturer can verify that the system has never been used, then he may be able to sell it as a new system.

Another advantage of the invention is that it may be completely non-invasive. The second and third embodiments permit detailed usage analysis to be performed on the computer system, perhaps allowing the manufacturer to develop more reliable, higher-performance systems. Further, the invention may make use of gaps between the hard disk drive sectors so that it does not detract from the hard disk drive performance. As such, the user is essentially unaware of the presence of the program.

It will be appreciated by those of ordinary skill having the benefit of this disclosure that the illustrative embodiments described above are capable of numerous variations without departing from the scope and spirit of the invention.

Accordingly, the exclusive rights sought to be patented are as described in the claims below.

What is claimed is:

1. A method, performed by a computer having (1) a bootable writable storage medium and (2) executing a usage-monitor program stored in a boot-sector of the storage medium, comprising:

(a) signaling the presence of the usage-monitor program; and (b) overwriting the usage-monitor program.

2. The method of claim 1, wherein the bootable writable storage medium is a writable hard disk.

3. The method of claim 1, wherein the usage-monitor program is overwritten with a computer program.

4. The method of claim 1, wherein the usage-monitor program is overwritten with a boot-sector program.

5. The method of claim 1, wherein the usage-monitor program signals its presence by presenting a data pattern on the data bits of a parallel port of the computer.

6. The method of claim 1, wherein the usage-monitor program signals its presence by emitting at least one audible tone on a computer speaker.

7. The method of claim 1, wherein the usage-monitor program signals its presence by presenting a message on the computer CRT.

8. A method, performed by a computer having a bootable writable storage medium, comprising:

(a) executing a usage-monitor program stored in a boot-up portion of the storage medium; and (b) overwriting the usage-monitor program.

9. The method of claim 8, wherein the bootable writable storage medium is a writable hard disk.

10. The method of claim 8, wherein the bootable writable storage medium is flash memory.

11. The method of claim 8, wherein the usage-monitor program is overwritten with a computer program.

12. The method of claim 8, wherein the usage-monitor program is overwritten with a boot-sector program.

13. A method, performed by a computer having (1) a hard disk drive and (2) executing a usage-monitor program stored in a boot-sector of the hard disk drive, comprising:

(a) signaling the presence of the usage-monitor program; and (b) overwriting the usage-monitor program.

14. The method of claim 13, wherein the usage-monitor program is overwritten with a computer program.

15. The method of claim 13, wherein the usage-monitor program is overwritten with a boot-sector program.

16. The method of claim 13, wherein the usage-monitor program signals its presence by presenting a data pattern on the data bits of a parallel port of the computer.

17. The method of claim 13, wherein the usage-monitor program signals its presence by emitting at least one audible tone on a computer speaker.

18. The method of claim 13, wherein the usage-monitor program signals its presence by presenting a message on the computer CRT.

19. A method, performed by a computer having a bootable writable storage medium, comprising:

(a) executing a usage-monitor program stored in a boot sector of the storage medium; and (a) overwriting the usage-monitor program.

20. The method of claim 19, wherein the bootable writable storage medium is a writable hard disk.

21. The method of claim 19, wherein the usage-monitor program is overwritten with a computer program.

22. The method of claim 19, wherein the usage-monitor program is overwritten with a boot-sector program.

* * * * *